Figure 1:
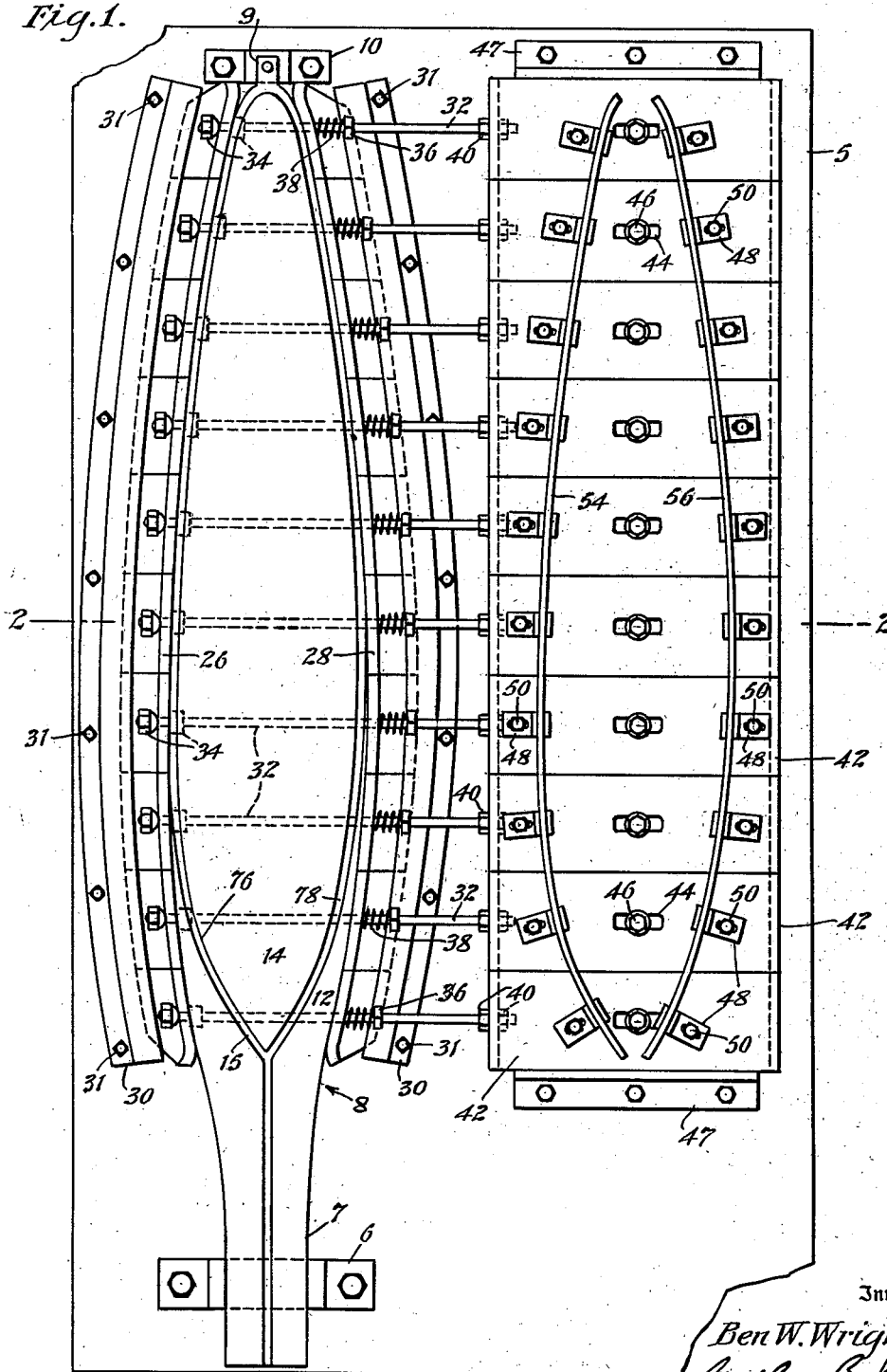

Oct. 4, 1949.　　　B. W. WRIGHT　　　2,483,957
WELDING GUIDE

Filed Jan. 30, 1947　　　2 Sheets-Sheet 1

Inventor
Ben W. Wright
Godfrey B. Speir
Attorney

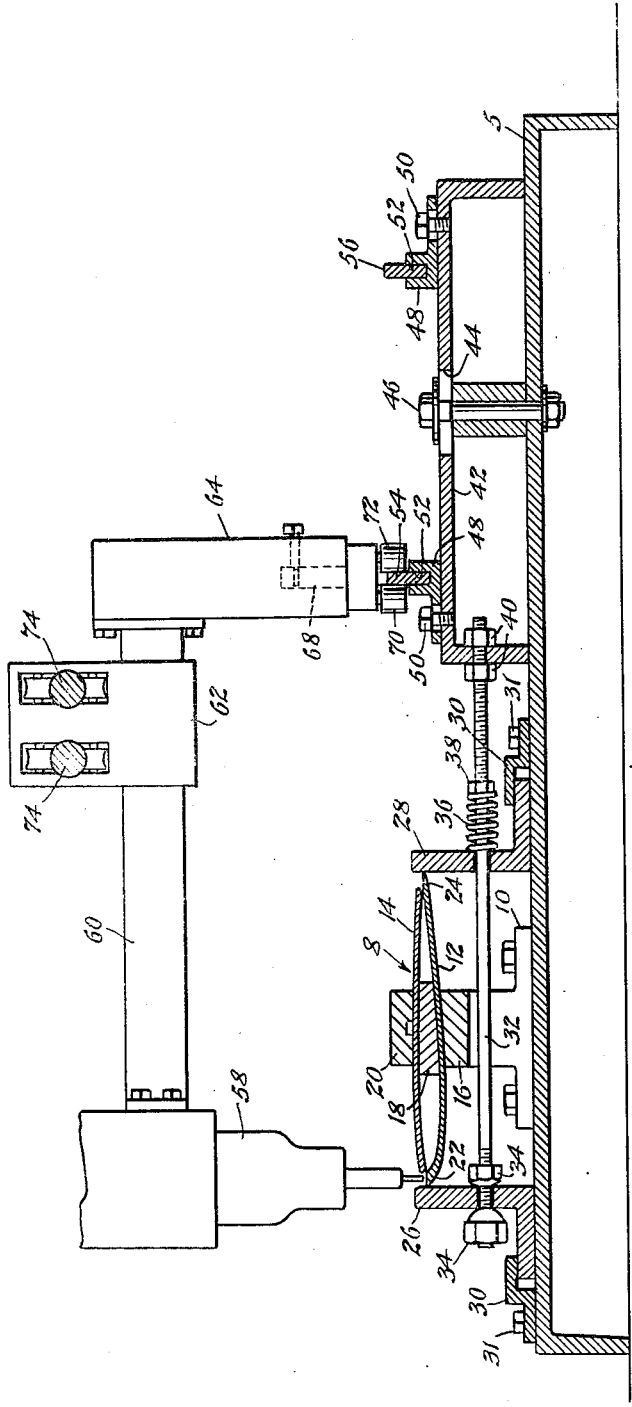

Patented Oct. 4, 1949

2,483,957

UNITED STATES PATENT OFFICE 2,483,957

WELDING GUIDE

Ben W. Wright, Boonton, N. J., assignor to Curtiss-Wright Corporation, a corporation of Delaware Application January 30, 1947, Serial No. 725,391

8 Claims. (Cl. 113—59)

1

This invention concerns automatic welding machines and relates particularly to improvements for guiding an automatic welding head along a welding path.

While this invention is not limited to the environment in which it is here presented, the invention was developed for use in the manufacture of hollow steel propeller blades. In such propeller blades, convex thrust and camber plates are preformed, the plates then being superimposed on one another after which weld metal is inlaid along the leading and trailing edges of the blade, integrally uniting the thrust and camber faces and forming portions of the leading and trailing blade edges. Originally, these blades were welded by manual operations and as the art progressed, automatic welding, such as submerged melt welding, was applied to the blades. It was found in using automatic welding that temporary warping of the plates during the welding process presented a considerable problem since the welding head is usually guided by a cam or guiding strip along a path representing the desired leading edge or trailing edge planform. When warping of the blade occurred during welding, the blade moved relative to the controlled welding head path so that the metal deposit was made erroneously.

It is an object of this invention to provide a guiding system for a welding head which will compensate for warping or displacement of the article being welded. It is a further object of the invention to provide a flexible guide track for the control of the path of a welding head and further to provide a means for flexing the welding guide track in conformance with displacement of the article being welded. It is a further object of the invention to provide a yieldable work holding fixture whose yield will affect corrective movement of a welding head during a welding operation.

A broader object of the invention is to provide a yieldable guide, associated with a work-piece, for guiding an instrumentality along the work-piece, the instrumentality affecting certain changes in the condition of the work-piece.

Further objects of the invention will become apparent in reading the annexed detailed description in connection with the drawings. The description and drawings are to be considered only as exemplary of one mode of practicing the invention and are not to be construed as limiting its scope. Reference should be had to the appended claims for a specific definition of the limits of the invention.

2

In the drawings,

Fig. 1 is a plan of a work holding fixture and guide system for a welding head or other instrumentality used for changing the condition of a work-piece, and Fig. 2 is a section on the line 2—2 of Fig. 1, also showing a welding head and guide follower arrangement.

In both figures, wherein similar numbers indicate similar parts, 5 represents a table upon which the work holding fixture and guide system are attached. Toward one corner of the table 5, a work clamp 6 is secured which as shown holds the shank end 7 of a propeller blade 8. The tip end of the propeller blade is provided with a short extension 9 engaging a dowel on a member 10 secured to the table 5. The propeller blade 8 as shown in Fig. 2 comprises a camber plate 12 and a thrust plate 14, the camber plate being rolled at its shank end to form the shank portion 7 and being so profiled as at 15 that the thrust plate will fit at its edges along the edges of the camber plate 12 and defining weld juncture paths 76 and 78. In laying up the plates 12 and 14 on the work holding fixtures, the camber plate 12 rests upon a central support 16 secured to the table 5, and a removable spacer 18 is placed between the plates 12 and 14 to hold them in their proper spaced relation. On the outer surface of the thrust plate 14, a support member 20 is secured, whereby the plates 12 and 14 are secured to one another for the welding process.

Along the leading edge 22 and along the trailing edge 24 of the propeller blade 8 are disposed a plurality of angle members 26 and 28 respectively. Each angle member covers a short portion of the propeller blade span and is movably mounted as will be described so that it may move with the propeller blade, should the latter move in the work holding fixture during the welding process. The portions of the angle members 26 and 28 which lie upon the table 5 are secured thereto, for movement relative to the table, by Z bars 30 secured as at 31 to the table. Angle members 26 and 28 lying opposite one another across the blade are secured to one another by rods 32, through the medium of nuts 34 engaging the member 26, and spring and nut arrangements 36 and 38 engaging the members 28. By tightening up each nut 38, after assembly of the foregoing parts, each set of members 26 and 28 is resiliently urged into contact with the leading and trailing edges 22 and 24 of the propeller blade, and both members 26 and 28 will move transversely with the blade should the latter warp during the welding operation.

An extension of each rod 32, extending rightwardly as shown, is secured by nuts 40 to a channel element 42 resting upon the table 5, there being one channel element 42 for each set of members 26 and 28, each channel member 42 having a length substantially the same as the length of each set of channel members 26 and 28. Thus, there will be a plurality of channel members 42 equal in number to the number of members 26 or members 28. Each channel member 42 will be movable independently of each other channel member in accordance with the position of the control members 26 and 28 secured to it. Each channel member 42 is provided with a central slot 44 and a bolt 46 or other suitable securing means passing through the slot 44 and engaging the table 5, securing the channel member to the table 5 but allowing sliding movement of the channel member. The end members 42 are bordered by fixed guides 47 secured to the table 5.

Upon each channel member 42, a pair of clips 48 are adjustably secured as by capscrews 50, and the upper side of each clip is formed with a groove 52. The clips 48 are adjustable on the bolts 50 so that they may be turned or moved back and forth along the channels 42. Within the succession of grooves 52 of the several clips 48, a leading edge guide strip 54 and a trailing edge guide strip 56 is laid, these guide strips being curved to conform to the desired weld paths 76 and 78 along the leading edge and trailing edge of the propeller blade 8.

Preferably, when a work setup is being made, the members 26 and 28 will be secured so that they lie against the leading and trailing edges of the blade 8, and then the members 42 will be adjusted to align with one another as shown in Fig. 1. When so located, the clips 48 and the guide strips or tracks 54 and 56 will be adjusted to conform to the desired weld paths 76 and 78 along the leading and trailing edges of the propeller blade.

As shown in Fig. 2, a welding head 58 is secured to a cross beam 60 slidably passing through a block 62, the right hand end of the cross beam 60 carrying a member 64 to which a roller pivot head 66 is pivotally secured at 68, the head 66 in turn, carrying guide following rollers 70 and 72. The block 62 carries rollers or other suitable means engaging over head rods 74 running longitudinally over the middle of the table 5. By this construction, the rollers 70 and 72 by their engagement with track 54 or 56 control the transverse movement of the welding head 58 as the block 62 is moved along the supports 74.

Assuming that a welding pass may have been started on the blade assembly from a point near the shank, welding will progress along the path 76, controlled by the guide track 54. As the welding progresses the temperature of the blade assembly is elevated materially along one edge, causing its material to expand thus temporarily warping the blade to the left of its normal position as controlled by the holding member 6 and 10. Without compensation, the welding head would then deviate from the desired path 76 but with the compensation by means of the apparatus described, the guide track 54 is warped in conformance with the warpage of the blade because the guide tracks and channels 42 are moved to conform to the position of the blade edge against which rest the guide controlling members 26. As each successive stage of welding is reached, the above compensation will occur and upon cooling of any blade zone it may return to its normal position with concurrent return of the guide track 54 to its normal position.

When the welding pass is made along the trailing edge of the blade using the guide track 56, the same sort of displacement will occur in response to blade movement; in this instance the blade will tend to warp toward the right and the guide track 56 for the trailing edge will likewise move toward the right, controlling the position of the welding head 58 so that it will lie at all times along the proper welding path 78.

The compensating structure above described is particularly applicable to automatic welding operations, either on propeller blades or on other articles which are subject to warpage during welding processing. A compensating arrangement of the character described might also be used for operations on work-pieces which do not involve welding but rather, involve brazing or other heating, or certain types of machine processes.

In effect, the invention provides means for guiding an instrumentality accomplishing an operation on a work-piece in response to the instant or local position of an increment of the work-piece itself, rather than guiding the instrumentality from a fixed or constant datum.

Though but a single embodiment of the invention has been illustrated and described, it is to be understood that changes may be made without departing from the spirit or scope thereof, as will be apparent to those skilled in the art. Reference should be had to the appended claims for a definition of the limits of the invention.

What is claimed is:

1. A welding fixture for the welding of elongated articles near their edges comprising means to hold the article, a plurality of substantially similar laterally movable members spaced along the article and each constrained to contact the article edge at different portions thereof, said members being individually laterally movable with the article during welding therealong upon temporary warping of the article at the zone of welding due to temperature changes, a flexible guide track spaced from the article edge and conformed to the desired weld path at said edge, means securing successive points along said track to successive members, whereby said guide track flexes in conformance with movements of said edge and members during welding, a welding head movable longitudinally of said article for welding feed, and means for moving said head laterally, engaging said guide track, to constrain said head to movement along the edge of said article concurrently with longitudinal head feed movement.

2. A fixture for an elongated article to be welded wherein the article is subject to warping during a welding pass along an edge thereof and wherein an edge of the article comprises the datum from which the weld path is established, comprising means to hold the article, a plurality of laterally movable members spaced along and each in contact with a different portion of said edge, a guide track secured to and movable laterally with said members and having the general configuration of said edge, and a welding head movable both longitudinally and laterally relative to said article having guide track engaging means to control the movement of said head laterally relative to the edge of said article as said head is moved longitudinally along said edge.

3. A fixture for an elongated article to be welded wherein the article is subject to warping during a welding pass, comprising an article holding means, said article having an edge portion adjacent the weld path, a plurality of means spaced along and contacting said portion and movable laterally with the article during warping, a welding head controlled in its lateral position relative to the article by said plurality of means, and means to support said head for longitudinal feed movement along said article.

4. A fixture for an elongated article to be welded wherein the article may move laterally during a longitudinal welding pass under the influence of thermal expansion and contraction, including means to hold said article, a plurality of guide members engaging the article at different parts therealong adjacent the weld path and movable laterally with respective parts during a welding pass, a welding head movable relative to the article along a weld path, and means to adjust said head laterally in its movement along said path in accordance with movements of said guide members.

5. A fixture for an article to be welded wherein the article may move laterally during a longitudinal welding pass under the influence of thermal expansion and contraction, including means to hold said article, a plurality of guide members engaging the article at different parts thereof and movable laterally with respective parts during a welding pass, a welding head movable relative to the article along a weld path, and means to adjust said head laterally in its movement along said path in accordance with movements of said guide members' said adjusting means comprising a flexible track secured to said members, and a track follower movable along said track and rigid with the welding head.

6. A fixture for an article to be welded wherein the article may move laterally during a longitudinal welding pass under the influence of thermal expansion and contraction, including means to hold said article, a plurality of guide members engaging the article at different parts thereof and movable laterally with respective parts during a welding pass, a welding head movable relative to the article along a weld path, and means to adjust said head laterally in its movement along said path in accordance with movements of said guide members, said adjusting means comprising a flexible track secured to said members, and a track follower movable along said track and rigid with the welding head said track being laterally spaced from the article.

7. In a welding fixture for elongated propeller blade components, means to support said components, a plurality of members spaced along and engaging different parts of a lateral edge of one said component and constrained to move therewith, a flexible guide track generally conformed to the desired weld path along said components, means to secure successive points along said track to successive members, and a welding head movable along the components, and movable laterally thereof, having a portion engaging said track to enforce the lateral movement and having a portion for depositing weld metal on said components in the vicinity of their edges as the head is moved along said components.

8. In a work holding fixture for an elongated workpiece whose condition is to be changed and which, during and by the change of condition, is moved transiently, means to support the workpiece for said transient movement, a plurality of members contacting the workpiece at different points therealong and movable with said workpiece, a flexible track adjacent said workpiece having spaced-apart portions thereof secured to respective said members, said track being conformed to a work-path like the work-path desired on the workpiece, and mechanism movable along and laterally over said workpiece having a portion engaging and position-controlled laterally by said track and having another portion laterally fixedly spaced from said first portion, for effecting a condition change in the workpiece, and means to move said mechanism along said track and workpiece.

BEN W. WRIGHT.

REFERENCES CITED

The following references are of record in the file of this patent:

UNITED STATES PATENTS

| Number | Name | Date |
| --- | --- | --- |
| 1,554,101 | Krebs et al. | Sept. 15, 1925 |
| 2,305,167 | Kasper | Dec. 15, 1942 |
| 2,403,514 | Franzen | July 9, 1946 |